(12) United States Patent
Tayrac et al.

(10) Patent No.: US 9,900,081 B2
(45) Date of Patent: Feb. 20, 2018

(54) METHOD FOR THE DYNAMIC ASSIGNMENT OF THE INSTANTANEOUS POWER AVAILABLE FROM A SATELLITE AND ASSOCIATED SYSTEM

(71) Applicant: THALES, Courbevoie (FR)

(72) Inventors: Pierre Tayrac, Saint Géniès Bellevue (FR); Olivier Courseille, Auzeville Tolosane (FR); Cyrille Yves Joël Blosse, Toulouse (FR); Bruno Roger, Toulouse (FR)

(73) Assignee: THALES, Courbevoie (FR)

( * ) Notice: Subject to any disclaimer, the term of this patent is extended or adjusted under 35 U.S.C. 154(b) by 93 days.

(21) Appl. No.: 14/860,466

(22) Filed: Sep. 21, 2015

(65) Prior Publication Data

US 2016/0087711 A1 Mar. 24, 2016

(30) Foreign Application Priority Data

Sep. 22, 2014 (FR) ...................................... 14 02107

(51) Int. Cl.
*H04B 7/185* (2006.01)
*H04W 72/04* (2009.01)
*H04W 52/04* (2009.01)

(52) U.S. Cl.
CPC ........ *H04B 7/18513* (2013.01); *H04W 52/04* (2013.01); *H04W 72/0473* (2013.01)

(58) Field of Classification Search
None
See application file for complete search history.

(56) References Cited

U.S. PATENT DOCUMENTS

2016/0366012 A1* 12/2016 Ginis .................... H04L 41/083

FOREIGN PATENT DOCUMENTS

| DE | EP 0805568 A1 * | 4/1997 | ............. H04B 7/185 |
|----|----|----|----|
| EP | 0 805 568 A1 | 11/1997 | |
| EP | 0 901 219 A2 | 3/1999 | |
| WO | 99/49590 A1 | 9/1999 | |

\* cited by examiner

*Primary Examiner* — Fan Ng
(74) *Attorney, Agent, or Firm* — Baker Hostetler LLP

(57) ABSTRACT

A method and a system for dynamic allocation of power for a satellite access network comprises a step for acquisition of a signal representative of an instantaneous power available on board at least one satellite and of a signal representative of the data rate in each resource allocation manager for the satellite access network, a step for conversion, for each resource allocation manager, of the signal representative of the data rate in the resource allocation manager into a value corresponding to the power consumed on board the satellite in order to obtain this data rate, a step for calculating a total power margin equal to the difference between the power available on board the satellite and the sum of the powers consumed by each resource allocation manager, a power allocation step, the value of power allocated being a function of the calculated total power margin.

9 Claims, 2 Drawing Sheets

METHOD FOR THE DYNAMIC ASSIGNMENT OF THE INSTANTANEOUS POWER AVAILABLE FROM A SATELLITE AND ASSOCIATED SYSTEM

CROSS-REFERENCE TO RELATED APPLICATIONS

This application claims priority to foreign French patent application No. FR 1402107, filed on Sep. 22, 2014, the disclosure of which is incorporated by reference in its entirety.

FIELD OF THE INVENTION

The present invention relates to the field of telecommunications by satellite. The present invention relates, more particularly, to a method and a system for the dynamic management of the instantaneous power available from a satellite.

BACKGROUND

The optimization of the capacity of a telecommunications satellite consists in matching the total power available on board the satellite with the power demand needed by all of the networks accessing the satellite. Currently, when a satellite telecommunications system is deployed, the use of the energy from the satellite is planned on the ground by considering a static power available on the satellite. The value of this power takes into account a margin covering all of the uncertainties over a time scale of a few months up to several years. Similarly, a fixed satellite power is allocated to each satellite access network, representative of a useful data transmission rate for this network. This planning assumes that the power available on board does not vary, nor does the data transmission rate of the satellite access networks.

However, the power available from a telecommunications satellite varies over time. These variations can be due, for example, to the aging of the satellite and of its electronics, to the variations in the payload due to thermal and/or thermo-elastic issues, to problems of directivity of the antennas. Similarly, the satellite access networks are subjected to operational variations in traffic leading to onboard power requirements that vary over time.

Owing to the use of a fixed onboard power, a part of the power actually available on board the satellite is not used and is lost. This additional power could, for example, allow the capacity of the communications system to be increased by increasing the data rate and/or the availability of the telecommunications links. Since the energy on board a satellite is limited, it is advantageous to provide a solution allowing the use of the instantaneous power available to be optimized.

Similarly, employing a fixed power allocated to each satellite access network does not allow it to be adapted to the real traffic, and hence represents a loss of efficiency.

One solution of the prior art for increasing the use of the resources of the satellite is to over-exploit the power of the said satellite ("over-booking of the satellite capacities") especially at the start of a mission of the satellite. One drawback of this practice is that the effects of this over-exploitation cannot be technically controlled.

SUMMARY OF THE INVENTION

One aim of the invention is notably to correct one or more of the drawbacks of the prior art by providing a solution allowing the power resource really available on the satellite to be exploited, while at the same time adapting the system to the real needs of the satellite access networks.

For this purpose, one subject of the invention is a method for the dynamic power allocation for a group of at least one satellite access network associated with a group of at least one satellite, the said group of at least one satellite access network comprising a plurality of managers for allocation of the resource, the said method being implemented by a device for dynamic allocation of power and comprising:

a step for acquisition of a signal, coming from telemetry data, representative of an instantaneous power available on board at least one satellite and of a signal representative of a data rate requirement in each resource allocation manager for each satellite access network, a step for conversion, for each manager for allocation of the resource of the group of at least one satellite access network, of the signal representative of the data rate requirement in the said satellite access network into a value corresponding to the power consumed on board the satellite in order to obtain this data rate, a step for calculating a total power margin equal to the difference between the power available on board the satellite and the sum of the powers consumed by each resource allocation manager, a step for allocating power to the various managers for allocation of the resource of the group of at least one satellite access network, the power value allocated being a function of the calculated total power margin.

According to one embodiment:

if the total power margin is higher than a first predetermined threshold, during the step for allocation of power, a module for dynamic allocation of power allocates to the various managers for allocation of the resource of the group of at least one satellite access network the levels of power consumed on board the satellite previously calculated, if the total power margin is below a second predetermined threshold, less than or equal to the said first predetermined threshold, during the step for allocation of power, a module for dynamic allocation of power allocates to the various managers for allocation of the resource of the group of at least one satellite access network levels of power consumed on board the satellite previously calculated, According to one embodiment, during the step for reduction of power allocated to the various resource allocation managers, the device for dynamic allocation of power allocates to the various resource allocation managers a predetermined default power level if the power margin is less than a third predetermined threshold.

According to one embodiment, the signal representative of the data rate requirement for at least one resource allocation manager is defined according to the data rate effectively transmitted over a period of time.

According to one embodiment, the signal representative of the instantaneous power available on board a satellite is transmitted to the dynamic allocation device by a satellite control centre.

According to one embodiment, the method furthermore comprises a step for acquisition of a signal representative of the quality of service associated with the data to be transmitted by each resource allocation manager and according to which the allocation of power is carried out as a function of the said quality information.

According to one embodiment, the various calculations are performed by means of at least one algorithm stored in a memory area of the system for dynamic allocation of power.

Another subject of the invention is a system for dynamic allocation of power configured for implementing the method previously described comprising a device for dynamic allocation of power and at least one satellite access network, the said group of at least one satellite access network comprising a plurality of resource allocation managers, each resource allocation manager being configured for transmitting data to at least one modem, each resource allocation manager being connected to the device for dynamic allocation of power and each resource allocation manager comprising a measurement device configured for measuring the data rate in the said resource allocation managers and delivering a signal representative of the said data rate and for transmitting this signal to the device for dynamic allocation of power, the said device for dynamic allocation of power comprising a calculation module configured for receiving signals representative of various quantities and carrying out calculations with these quantities, a module configured for allocating a level of power to the various managers for allocation of the resource of the group of at least one satellite access network and at least one memory area.

According to one embodiment, the system comprises a satellite control centre configured for receiving the telemetry data from at least one satellite, the said telemetry data comprising the instantaneous power available on board each satellite, and transmitting to the device for dynamic allocation of power a signal representative of the instantaneous power available on board each satellite.

According to one embodiment, the system comprises a link supervision centre configured for calculating and transmitting a signal representative of the instantaneous power available on board each satellite.

BRIEF DESCRIPTION OF THE DRAWINGS

Other features and advantages of the present invention will become more clearly apparent upon reading the description hereinafter, presented by way of non-limiting illustration and with reference to the appended drawings, in which.

It should be noted that the use of the expression "instantaneous power available from the satellite" denotes the instantaneous power available in the transponders of the satellite. This instantaneous power available corresponds to the power available on board the satellite taking into account notably the variations in charge of the battery or batteries and in the environment of the satellite such as for example the exposure to sunlight or the aging of the hardware. This instantaneous power available is to be differentiated from the static power available which takes into account margins for modelling these variations mentioned hereinabove.

DETAILED DESCRIPTION

The principle of the invention is based on a coupling between the telecommunications satellite or satellites and the ground station or stations in such a manner as to regularly inform them of the value of the instantaneous power available on board the satellite or satellites and thus to be able to dynamically optimize the use of the instantaneous power resources available within each satellite. In addition, pooling of the power needs of the access networks allows these power needs to be optimized, and their variations over time.

Figure 1:
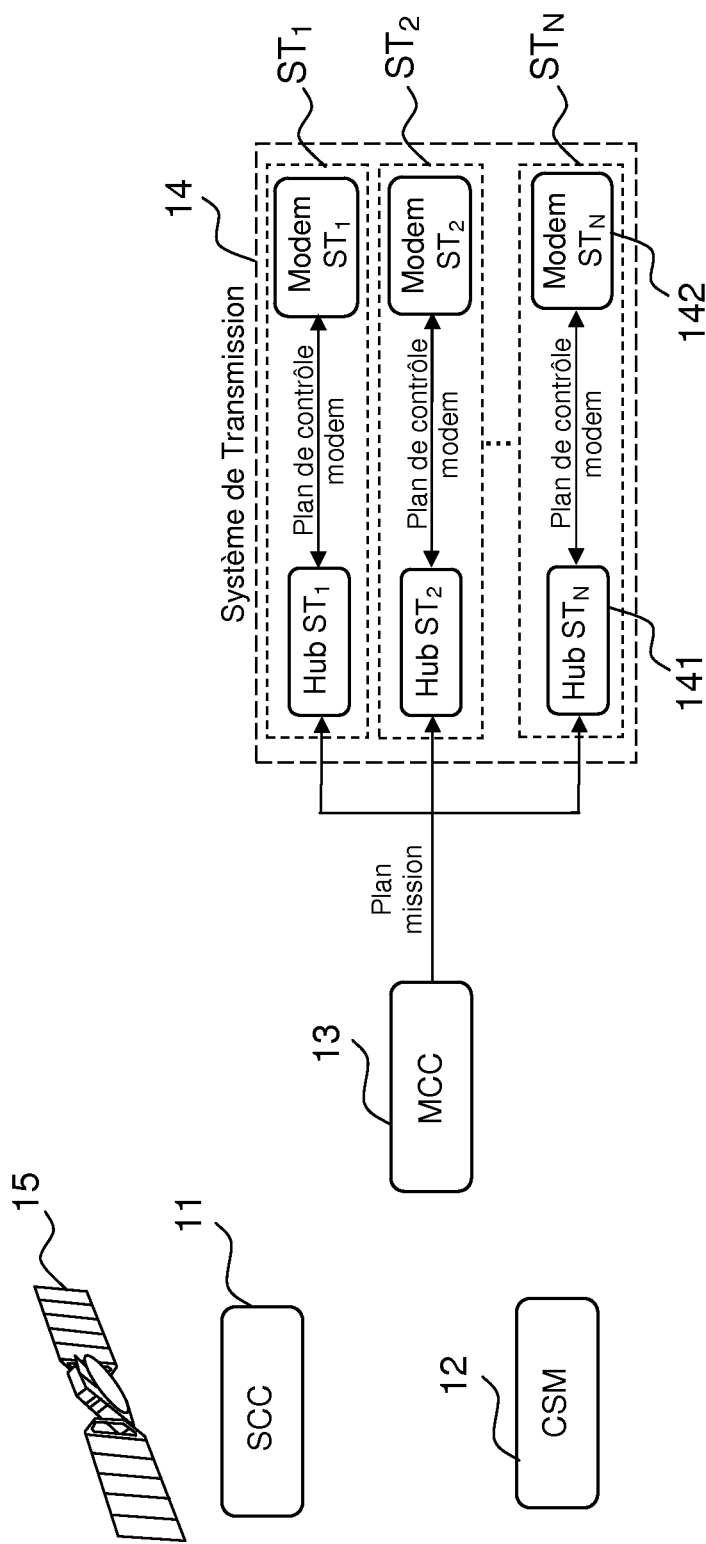
FIG. 1 shows a telecommunications system known from the prior art.

FIG. 1 shows a telecommunications system known from the prior art. The system comprises a satellite control centre 11 or SCC. The satellite control centre continuously monitors the behaviour of the satellite or satellites for which it is responsible notably by means of the telemetry data. The satellite control centre is the means on the ground which controls the satellite or satellites and which allows of assurer the correct operation of the satellite. It allows, for example, information on the instantaneous power really available on board the satellite to be collected and hence on the additional power margin available with respect to the static power.

The communication monitoring centre 12 or CSM (for Communication Spectrum Monitoring) monitors the payload of the satellite. It notably supplies the radiofrequency and digital characteristics of the transponders of the satellite. It also allows undesirable events to be detected such as for example problems of interference or of scrambling.

The satellite access networks 14 comprise a plurality of resource allocation managers (or hubs) 141, each resource allocation manager 141 managing at least one modem 142. A satellite access network comprises a resource allocation manager 141 and at least one modem 142. In order not to overload the figure, only one modem 142 per resource allocation manager 141 is shown in FIG. 1. The satellite access networks 14 are connected to a mission control centre 13 or MCC. This centre 13 provides the operational management of the payload of the satellite. It notably defines the mission plan for the satellite control centre 11 and for each satellite access network 14. This mission plan comprises, amongst other things, the power allocation table defining the fractional sharing of the power between the various resource allocation managers 141 of the various satellite access networks 14.

As previously seen, the mission plan is defined at the start of a mission and remains fixed throughout the said mission until a new mission plan is manually planned by an operator in the mission control centre 13. Similarly, the connection between the mission control centre 13 and the satellite access network 14 is unidirectional and is used, amongst other things, for the allocation of the power between the various resource allocation managers 141 according to the fractional sharing defined in the mission plan. Thus, each resource allocation manager operates in an independent manner.

The centres for satellite control 11, for monitoring of the communications 12, for mission control 13, together with the various resource allocation managers 141 for the satellite access networks 14, are generally distributed within a ground station. The various modems 142 are localized at the users.

Figure 2:
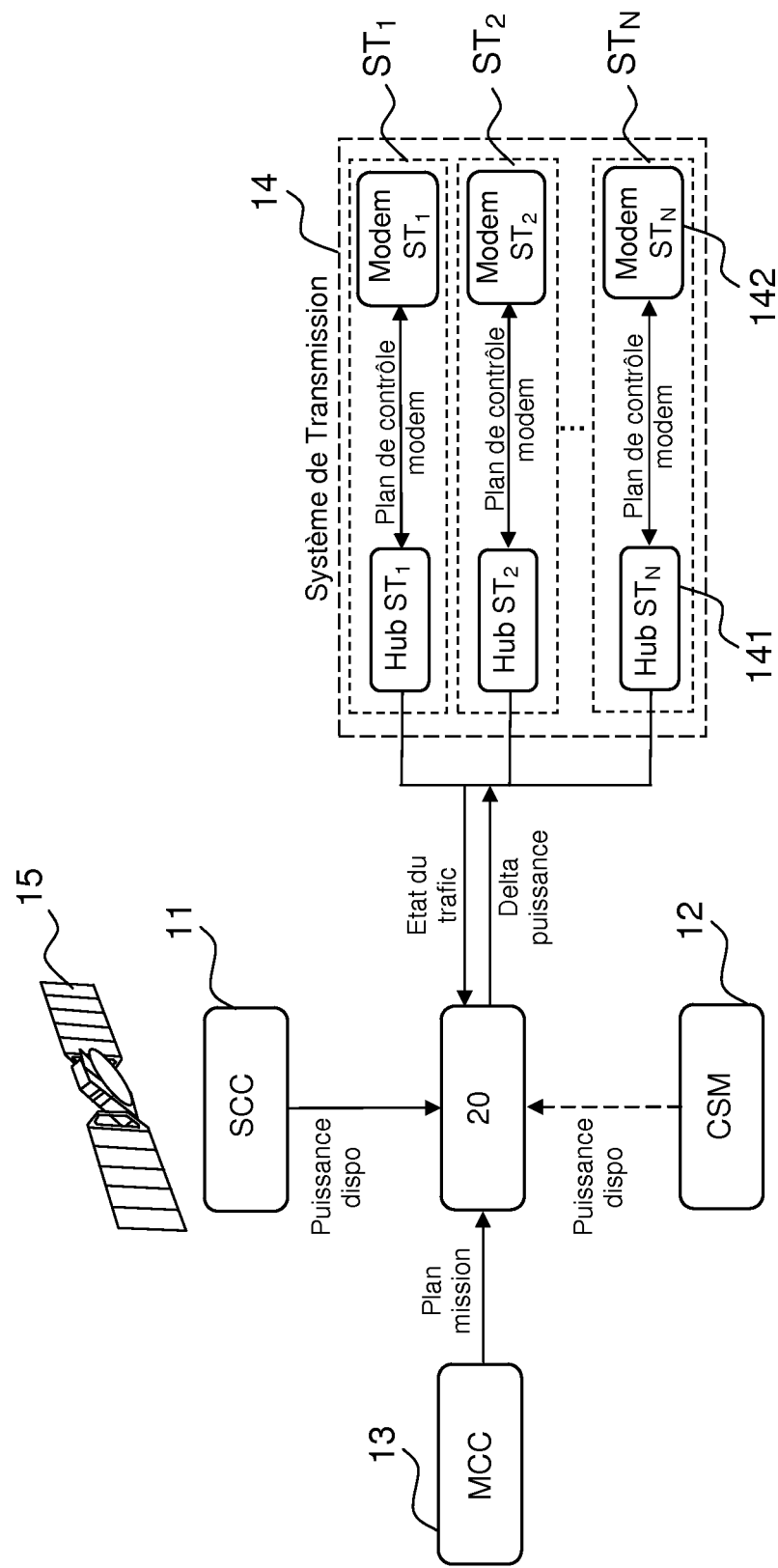
FIG. 2 shows one exemplary embodiment of a system for dynamic allocation of the instantaneous power available from at least one satellite according to the invention.

FIG. 2 shows one exemplary embodiment of a system for dynamic allocation of the instantaneous power available from at least one satellite according to the invention.

The system can comprise a satellite control centre 11, a mission control centre 13 and at least one satellite access network 14. In certain embodiments, the system may also comprise a communication monitoring centre 12.

In FIG. 2, the system only manages one satellite 15. This example is non-limiting and the invention may be generalized to the case where the system would be in communication with a plurality of satellites 15.

The satellite or satellites 15 may be of the transparent type, in other words these satellites 15 reflect the signals received from one or more ground stations by means of transponders. The satellites may also be of the regenerative type, with demodulation of the received signals and modulation of the transmitted signals. The group of at least one satellite 15 comprises at least one multi-channel satellite.

The device 20 for dynamic allocation of the instantaneous power available from at least one satellite 15 is responsible for the allocation of the power resources to the various resource allocation managers 141 for the satellite access networks 14 as a function of the traffic demands coming from the groups of modems 142 connected to the various resource allocation managers 141 and as a function of the power available in the satellite. This device 20 is interposed between the mission control centre 11 and the satellite access networks 14. It allows a link to be established between the payload of the satellite 15 and the ground station in order to exchange data allowing the value of the instantaneous power available on board the satellite to be defined.

In the embodiment illustrated in FIG. 2, the dynamic allocation device 20 is connected to the satellite control centre 11, to the mission control centre 13 and to the satellite access networks 14. The dynamic allocation device 20 can be connected to a communication monitoring centre 12. The group of satellite access networks comprises N satellite access networks referenced $ST_1$ to $ST_N$. As previously, so as not to overload the figure, only one modem 142 is shown per satellite access network. It will be understood that the satellite access networks can comprise a higher number of them.

In order to dynamically manage the instantaneous power available on board a satellite, the dynamic allocation device 20 carries out the acquisition of a signal, coming from the telemetry data, representative of the value of the instantaneous powers available on board the satellite 15 for various sub-assemblies of the payload. This acquisition can be carried out at regular intervals or in an irregular manner over time. Depending on the configuration of the satellite and on the optimization sought, these sub-assemblies may for example be high power amplifiers, assemblies of high power amplifiers (with the same satellite emission coverage), or the payload. According to one embodiment, the interval of time between the various acquisitions can be a few minutes. This signal may be recorded at the moment of the acquisition in a memory area of the system so as to be used later on. Advantageously, the periodic update of the performances of the satellite allows the fluctuations in the performances of the satellite 15 over time to be taken into account.

According to one embodiment, the signal representative of the instantaneous power available on board the satellite 15 can be transmitted by the satellite control centre 11. As previously seen, the telemetry signals transmitted by the satellite 15 include signals representative of the levels of instantaneous power available within the satellite for the various sub-assemblies of the payload. The satellite control centre 11 can therefore extract this information and transmit it to the dynamic allocation device 20 in the form of signals representative of these quantities. For this purpose, the satellite control centre 11 can comprise a module configured for extracting from the telemetry signals transmitted by the satellite 15 the signals representative of the levels of instantaneous power available from the satellite and transmitting to the dynamic allocation device 20 signals representative of these values.

According to another embodiment, the signals representative of the powers available on board each satellite are supplied by the communication monitoring centre 12. This centre 12 can comprise, for example, a measurement device of the spectrum analyzer type which measures the levels of power received and delivers signals representative of these received powers. This device also measures the levels of use of the onboard amplifiers. Based on these measurements, the measurement device of the communication monitoring centre 12 calculates the instantaneous powers available within the satellite and delivers signals representative of these instantaneous powers available on board the satellite that it transmits to the power allocation device 20.

According to one embodiment, the satellite control centre 11 and the link supervision centre 12 are connected to the dynamic allocation device 20 and can transmit to it together the signals representative of the instantaneous powers available on board the satellite 15 for example for the purposes of redundancy.

The dynamic allocation device 20 also carries out, for each resource allocation manager 141 of each satellite access network 14, the acquisition of a signal representative of the data rate of the resource allocation manager 141 in question. For this purpose, each resource allocation manager 141 can comprise a measurement device configured for measuring the various elementary data rates originating from the various modems 142 in the said resource allocation manager and delivering a signal representative of a global data rate. This measurement device can also be configured for transmitting this signal to the dynamic power allocation device 20. This signal may be recorded simultaneously with the moment of the acquisition in a memory area of the system for dynamic allocation of power in order to be used at a later time. In addition to this rate data, the device can also acquire, within each resource allocation manager, signals representative of other information, such as the quality of service for the data to be transmitted. This information on quality of service may, for example, be used as a criterion for allocation of power to the various resource allocation managers 141.

At this time, the dynamic allocation device 20 disposes of the value of the power available and of the data rates required by each satellite access network. Depending on the variation over time of the demand for data rate coming from the various resource allocation managers 141, the module for dynamic allocation of power can thus, for example using an algorithm stored in a memory area of the system for dynamic allocation of power, increase or decrease the power allocated to one or more resource allocation managers 141. This principle is applied for all of the satellite access networks 14.

In the case of a conflict, in particular in the case of a lack of power available to meet a data rate requirement for one or more satellite access networks 14, a mechanism for prioritizing may be installed in the algorithm for allocation of the power, in such a manner as to increase the priority of the power of the satellite access networks 14 with the highest priority, by using for example the information on quality of service provided by the resource allocation managers.

According to one embodiment, the signal representative of the data rate requirement for at least one resource allocation manager 141 is defined according to the data rate effectively transmitted over a predetermined period of time.

Each signal representative of the data rate requirement of the resource allocation managers 141 is converted into a value corresponding to the power that would be consumed on board the satellite 15 in order to obtain this data rate. This conversion can consist in carrying out, for each signal representative of the data rate requirement of the resource allocation managers 141, a calculation of a link power consumption allowing the minimum ground and onboard power levels ensuring the transmission to be identified. This conversion may be carried out in the satellite access network 14 or in the dynamic allocation device 20 for example by a processor module. According to one embodiment, the conversion may be carried out using an algorithm stored in a memory area of the system for dynamic allocation of power, for example a memory area of the device for dynamic allocation of power 20. The various powers consumed on board for the various resource allocation managers are subsequently summed, so as to evaluate the total powers consumed by the satellite 15, needed in order to allow the total data rate transiting in all the resource allocation managers 141 of the satellite access network 14.

These values of total power are compared to the values of power available on board the satellite so as to verify whether an allocation, to the resource allocation managers 141, of the powers calculated would lead to a saturation of the sub-assemblies of the payload or whether such an allocation would leave power available to them.

The calculation module of the dynamic allocation device 20 then defines total power margins, equal to the difference between the sum of the powers available on board the satellite and the sum of the powers corresponding to the data rates desired by the various resource allocation managers 141 of each sub-assembly of the payload.

The dynamic power allocation device 20 can thus allocate to the various resource allocation managers 141 a value (positive or negative) of power as a function of the value of the total power margins, compared to thresholds, for each sub-assembly of the payload.

If the total margin is higher than a first predetermined threshold, the dynamic allocation device 20 can allocate, to each resource allocation manager 141, the power previously calculated taking into account for example its request for data rate or its measured data rate. For this purpose, the dynamic power allocation device 20 can comprise a power allocation module configured for allocating a certain level of power to the various resource allocation managers 141.

A total margin higher than the said first predetermined threshold can represent an under-exploitation of the instantaneous power available for at least one sub-assembly of the payload. The power allocation module can therefore allocate more power to certain resource allocation managers for the satellite access networks 14.

If the total margin is below a second predetermined threshold, the said second threshold being less than or equal to the aforementioned first threshold, the dynamic allocation device 20 cannot allocate to each resource allocation manager 141, the value of power equivalent to the desired value of data rate. According to one embodiment, the dynamic power allocation device 20 can reduce the value of the various powers to be allocated to the various resource allocation managers 141 in such a manner as to bring the difference between the sum of the powers available on board the satellite and the sum of the powers corresponding to the data rates that may be allocated to the various resource allocation managers 141, for example, to a predetermined positive value corresponding for example to a safety margin. This value may for example be stored in a memory area of the device 20 or of the power allocation system.

According to one embodiment of the method according to the invention, when the measured total power margin is less than a third predetermined threshold (or safety threshold), the dynamic allocation device 20 can allocate to each resource allocation manager 141a value of power defined by default in the mission plan by the mission control centre 13. For this purpose, the power allocation module can read in a memory area, for example of the power allocation device 20 or of the mission control centre 13, the mission plan and attribute to each resource allocation manager the level of power written in the allocation table of the mission plan.

According to one embodiment, one or more of the aforementioned thresholds may be stored in a memory area of the system for dynamic allocation of power or of the dynamic allocation device 20.

According to one embodiment of the method, the calculation module of the dynamic allocation device 20 can also calculate the fractional use of the allocated power for each resource allocation manager and compare this value with a predetermined floor use level corresponding to an under-exploitation of the power allocated. When the fractional use measured on a resource allocation manager 141 becomes lower than this floor level, the power allocation module of the dynamic allocation device 20 can reduce the power allocated for the under-exploited resource allocation manager 141 for example by reducing the value of the power allocated to the under-exploited resource allocation manager to the floor value. The power freed up, corresponding to the difference between the allocated power value and the floor value, can thus be re-allocated to one or more other resource allocation managers 141 of one or more satellite access networks 14.

The method according to the invention has been described by considering the values of equivalent power that the transponders of the satellite or satellites 15 would consume in order to obtain the data rate of the resource allocation managers 141. This description is non-limiting and the same method may be considered by taking into account the data rate in each resource allocation manager 141 of each of the satellite access networks 14.

According to one embodiment, the various calculations are performed by means of at least one algorithm stored in a memory area of the system for dynamic allocation of power, for example a memory area of the dynamic power allocation device 20.

According to one embodiment, the dynamic power allocation device 20 may be or may comprise a computer, a processor, a logic processing unit or any other equivalent data processing means.

Similarly, the various modules present in the system for dynamic allocation of power, such as for example the processing modules, the power allocation modules, may be or may comprise one or more computers, one or more processors, one or more logic processing units a combination of the aforementioned elements or any other equivalent data processing means.

Advantageously, the invention allows the use of the power of the transponders of the satellite or satellites 15 to be optimized and thus to improve the instantaneous capacity of the satellite access network or networks 14 in terms of data rate and/or of availability.

It also allows the power resources of the satellite 15 to be exploited by taking into account the instantaneous performance of the payload and of its fluctuations over time. This allows the use of the satellite power to be optimized over time.

The invention claimed is:

1. A method for the dynamic power allocation for a group of at least one satellite access network associated with a group of at least one satellite, the group of at least one satellite access network including a plurality of resource allocation managers, the method being implemented by a device for dynamic allocation of power, the method comprising:

a step for acquisition of a first signal, coming from telemetry data, representative of an instantaneous power available on board at least one satellite and a second signal representative of a data rate requirement in each resource allocation manager for each satellite access network;

a step for conversion, for each resource allocation manager of the group of at least one satellite access network, of the second signal representative of the data rate requirement in the satellite access network into a value corresponding to the power consumed on board the satellite in order to obtain this data rate;

a step for calculating a total power margin equal to the difference between the power available on board the satellite and the sum of the powers consumed by each resource allocation manager; and a step for allocating power to the various resource allocation managers for the group of at least one satellite access network, wherein the value of power allocated is determined such that:

if the total power margin is higher than a first predetermined threshold, during the step for allocation of power, a module for dynamic allocation of power allocates to the various resource allocation managers for the group of at least one satellite access network the levels of power consumed on board the satellite previously calculated, and if the total power margin is lower than a second predetermined threshold, less than or equal to the said first predetermined threshold, during the step for allocation of power, a module for dynamic allocation of power reduces the value of the various powers to be allocated to the various resource allocation managers to bring the difference between the sum of the powers available on board the satellite and the sum of the powers corresponding to the data rates desired by the various resource allocation managers to a predetermined positive value.

2. The method according to claim 1, wherein, during the step for the reduction of power allocated to the various resource allocation managers, the device for dynamic allocation of power allocates to the various resource allocation managers a predetermined level of power by default if the power margin is lower than a third predetermined threshold.

3. The method according to claim 1, wherein the second signal representative of the data rate requirement for at least one resource allocation manager is defined according to the data rate effectively transmitted over a period of time.

4. The method according to claim 1, wherein the first signal representative of the instantaneous power available on board a satellite is transmitted to the dynamic allocation device by a satellite control center.

5. The method according to claim 1, wherein the method further comprises a step for acquisition of a third signal representative of the quality of service associated with the data to be transmitted by each resource allocation manager, and in which the allocation of power is applied as a function of the information on quality.

6. The method according to claim 1, wherein the various calculations are carried out by means of at least one algorithm stored in a memory area of the system for dynamic allocation of power.

7. A system for the dynamic power allocation configured for implementing the method according to claim 1, comprising:

a device for the dynamic power allocation and at least one satellite access network, the group of at least one satellite access network including a plurality of resource allocation managers, each resource allocation manager being configured for transmitting data to at least one modem, each resource allocation manager being connected to the device for dynamic allocation of power and each resource allocation manager including a measurement device configured for measuring the data rate in the resource allocation managers and delivering a third signal representative of the said data rate and for transmitting the third signal to the device for the dynamic power allocation, the device for the dynamic power allocation comprising a calculation module configured for receiving signals representative of different quantities and performing calculations with said different quantities, a module configured for allocating a level of power to the resource allocation managers for the group of at least one satellite access network, and at least one memory area.

8. The system according to claim 7, wherein the system comprises a satellite control center configured for receiving the telemetry data from at least one satellite, the telemetry data comprising the instantaneous power available on board each satellite, and transmitting to the device for the dynamic power allocation a fourth signal representative of the instantaneous power available on board each satellite.

9. The system according to claim 7, wherein the system comprises a link supervision center configured for calculating and transmitting a fourth signal representative of the instantaneous power available on board each satellite.

* * * * *